United States Patent Office 3,027,365
Patented Mar. 27, 1962

3,027,365
PRODUCTION OF REACTION PRODUCTS OF METHYLOL UREA WITH AMMONIUM CONTAINING COMPOUNDS
Frederick F. Pollak, New York, N.Y., assignor to The Marblette Corporation, Long Island City, N.Y., a corporation of New York
No Drawing. Filed Oct. 13, 1958, Ser. No. 766,681
5 Claims. (Cl. 260—239)

This invention relates to the production of reaction products of methylol urea with ammonia, or ammonia-yielding compounds, under controlled reaction quantity conditions such that uniform reaction products are obtained. More specifically, stable and uniform intermediate products of the urea-formaldehyde type are produced in predictable quantity and of predetermined uniform quality, by the reaction of three mols of a methylol urea with one mol of ammonia.

Heretofore, condensation products of urea and formaldehyde have been subject to certain shortcomings encountered in commercial practice and widely recognized in the literature. While these products per se are glasslike and colorless, it was impossible to use them as such because of their instability under atmospheric conditions. They are not of a uniform character, consisting of a number of insoluble products which react in widely different degrees towards humidity. Thus they were subject to swelling and cracking when the humidity of the atmosphere changed. Consequently they were required to be used in admixture with fillers such as cellulose or cellulose derivatives which acted as absorbents of humidity.

By contrast, the present invention provides a method for producing uniform reaction products from which final products may be formed by systematic synthesis. Uniform intermediate products from urea, formaldehyde and ammonia are formed under simple operating conditions in an exothermic reaction when a methylol of urea is mixed with ammonia or an ammonium salt in the stated molar ratio without the application of heat. The reaction is usually performed in water solution.

It appears that stable new products are thus prepared, depending upon whether the monomethylol urea is reacted with the ammonia in the required molar ratio, or the dimethylol urea is so reacted in that ratio. It is believed that the basic reactions are as follows, although the following schematic equations do not appear adequately to account for the bond between the resulting reaction product or condensation product and the water:

$NH_3 + 3CH_2OH \cdot NH \cdot CO \cdot NH_2$
$= N(CH_2NH \cdot CO \cdot NH_2)_3 + 3H_2O$ and $2NH_3 + 3CH_2OH \cdot NH \cdot CO \cdot NH \cdot CH_2OH$
$= N_2(CH_2NH \cdot CO \cdot NH \cdot CH_2)_3 + 6H_2O$ It appears likely that the respective products are (1) nitrogen - trimethylene-triurea-triammonium-hydrate and (2) dinitrogen-hexamethylene - triurea-hexammonium-hydrate. The respective formulas are:

(1)
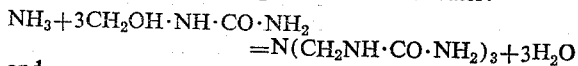
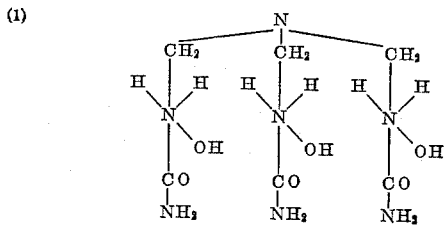

(2)
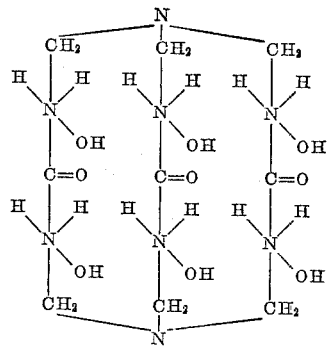
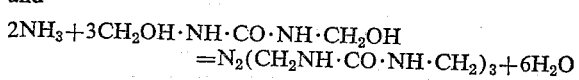

The solutions resulting from the reactions described above are slightly viscous liquids, which when concentrated in vacuo, are colorless and transparent and sticky, and which appear to retain the water of reaction. They possess some of the characteristics of ammonium hydrate bases, being derivatives of a hypothetical diallyl-ammonium-hydroxide and therefore containing pentavalent nitrogen atoms. They are very soluble in water and alcohols, fairly strongly basic, and give salts with most of the stronger acids.

The nitrogen atom introduced by the above reaction is firmly attached, and is not split off by boiling with dilute acids or alkalis. Each of the products has a considerable number of reactive groups and is a valuable intermediate for the production of plastics and other valuable products having controlled molecular weight and predetermined chemical composition. Solid products may be obtained from the resulting intermediate compositions by heating for a prolonged period at about 80° C.

The condensation product of 3 mols of methylol-urea with 1 mol of ammonia may be precipitated, with considerable care, by adding a large excess of acetone to the water solution and eliminating the last trace of acetone by prolonged heating. The resulting product was analyzed giving the following result:

Calculated for $C_6H_{15}N_7O_3 \cdot 3H_2O$ __ N: 34.15%.
Determined _____ N: 35.05, 35.09%.

This product, when heated for some time to 80–100° C. does slowly solidify to a glasslike, colorless substance, while giving up ammonia. It may be readily assumed that the alkaline product hereby is transformed by partial self-saponification and whereby at least 2 amide groups join to form an imido body. If, for instance, the heating is continued for 60 hours at 80° C. the analysis of the so obtained product give the following figures:

Calculated for $C_{12}H_{27}N_{13}O_6$ _ N: 40.52%.
Determined _____ N: 39.20, 39.35, 39.02%.

These products are somewhat less soluble in water than the original products.

The condensation product of 3 mols of dimethylol-urea and 2 mols of ammonia is after evaporation in vacuo a very viscous liquid which on prolonged heating to 80° C. solidifies to a powder which upon analysis gave the following figures:

Calculated for $C_9H_{18}N_8O_3 \cdot 6H_2O$ ___ N: 28.43%.
Determined _____ N: 29.46, 29.35%.

The close correlations between calculated nitrogen content and the actual analysis is significant.

The reaction between the methylol-urea and the ammonia is a very energetic one and it is advisable to perform it in the cold to prevent partial saponification of the amide or imide groups in the molecule of the reaction product. Either ammonium salts of weak acids (e.g. tartaric, citric, etc.) or of strong acids (e.g. sulfuric, hydrochloric) may be used; however, with salts of strong acids the ammonium compound has a tendency to come out of solution rather rapidly because the liberated free acids form salts of the ammonium groups which seem to be highly polymerized.

The invention may be variously embodied and practiced, and it is to be understood that the following examples are illustrative and are not to be considered to limit the scope of the invention. Parts are by weight.

*Example 1.*—The solution of methylol-urea as obtained from 300 parts of urea, 200 parts of water, 3 parts of hexamethylenetetramine and 405 parts by weight of formaldehyde (37%) is gradually mixed with 32 parts of ammonia (100% in 3 times its weight of $H_2O$) while being kept below 30° C. The addition takes about an hour. The mixture is now stirred until the excess of ammonia has disappeared. This reaction is a quantitative one and the solution contains now the pure nitrogen-trimethylene-triurea-triammonium-hydrate.

*Example 2.*—The solution of methylol-urea as described in Example 1 is poured on 129.5 parts of ammonium acetate, whereby a strong exothermic reaction takes place. The solution so obtained is cooled down. The reaction product has an acid reaction.

*Example 3.*—The solution of methylol urea as described in Example 1 is mixed with a solution of 154 parts of ammonium tartrate in 250 parts of water and allowed to stand about half an hour. The temperature of the solution will go up to about 60° C. By this time all the methylol groups are incorporated into the new compound.

*Example 4.*—300 parts of urea and 3 parts of hexamethylenetetramine are dissolved in 810 parts of formaldehyde (37%) by warming up to 30–40° C. After a short while the formaldehyde will be completely consumed and the solution is now cooled down. It is poured on 165 parts of ammonium carbonate. Vehement evolution of $CO_2$ will ensue and the ammonium carbonate is dissolved. After that the solution is boiled to destroy any excess of ammonium carbonate. The yield of dinitrogen-hexamethylene-triurea - hexammoniumhydrate is nearly 100%. The solution is stable for an unlimited period of time.

*Example 5.*—The di-methylol solution as described in Example 4 is poured on 760 parts of ammonium borate ($NH_4B_4O_7 \cdot 3H_2O$) plus 500 parts of water. A mild exothermic reaction takes place, whereby the free boric acid is precipitated. It is necessary to complete the reaction by slightly warming up to 50° C. After about 30 minutes the reaction is complete. The boric acid may be filtered off after cooling and is completely regained except for the small part which is dissolved in the clear viscous filtrate. It has acid reaction but is of remarkable stability.

*Example 6.*—The di-methylol-urea solution as described in Example 4 is poured in 220 parts of ammonium phosphate dibasic and 500 parts of water. The ensuing exothermic reaction will raise the temperature of the liquid to about 60° C. After about 15 minutes the methylol groups are completely used up. The solution will stay perfectly clear for a limited period of time, but in most instances it is preferably neutralized with sodium hydroxide for stability purposes.

Although these examples illustrate the invention, it is to be understood that the scope of protection is not to be limited thereto.

What is claimed is:
1. The method of producing a stable plastic intermediate composition having the formula

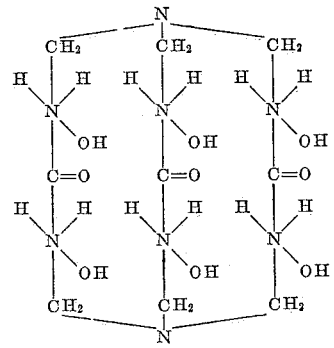

which comprises reacting dimethylol urea with a nitrogen containing compound selected from the group consisting of ammonia and an ammonium salt of a weak acid in molar proportion of 2 mols nitrogen containing compound to 3 mols of dimethylol urea.

2. The method of claim 1 conducted in the absence of external heat.
3. The method of claim 1 performed in water solution.
4. The method of claim 1 performed in a solution of a weak acid.
5. A chemical composition having the formula

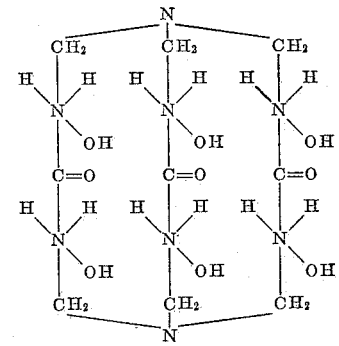

References Cited in the file of this patent
UNITED STATES PATENTS

| Re. 22,828 | Miller | Jan. 14, 1947 |
| 1,458,543 | Pollak | June 12, 1923 |
| 2,088,227 | Battye | July 27, 1937 |
| 2,193,630 | Howland | Mar. 12, 1940 |
| 2,230,121 | Pollak | Jan. 8, 1941 |
| 2,339,768 | D'Alelio | Jan. 25, 1944 |
| 2,340,044 | D'Alelio | Jan. 25, 1944 |
| 2,626,251 | James et al. | Jan. 20, 1953 |

UNITED STATES PATENT OFFICE
CERTIFICATE OF CORRECTION

Patent No. 3,027,365                                         March 27, 1962

Frederick F. Pollak

It is hereby certified that error appears in the above numbered patent requiring correction and that the said Letters Patent should read as corrected below.

Column 2, line 21, for "diallyl-" read -- dialkyl- --.

Signed and sealed this 24th day of July 1962.

(SEAL)
Attest:

ERNEST W. SWIDER
Attesting Officer

DAVID L. LADD
Commissioner of Patents